(12) United States Patent
Katou

(10) Patent No.: US 8,662,674 B2
(45) Date of Patent: Mar. 4, 2014

(54) METHOD FOR CONTROLLING COOLING DEVICE, COOLING DEVICE, AND PROJECTION-TYPE DISPLAY DEVICE

(75) Inventor: Takeshi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 257 days.

(21) Appl. No.: 13/138,705

(22) PCT Filed: Mar. 26, 2009

(86) PCT No.: PCT/JP2009/056137
§ 371 (c)(1),
(2), (4) Date: Sep. 21, 2011

(87) PCT Pub. No.: WO2010/109634
PCT Pub. Date: Sep. 30, 2010

(65) Prior Publication Data
US 2012/0026470 A1    Feb. 2, 2012

(51) Int. Cl.
*G03B 21/18*    (2006.01)
(52) U.S. Cl.
USPC .................................. 353/57; 353/60; 353/61
(58) Field of Classification Search
USPC .......................................... 353/57, 52, 60, 61
See application file for complete search history.

(56) References Cited

U.S. PATENT DOCUMENTS

| | | | |
|---|---|---|---|
| 6,322,218 B1 | 11/2001 | Sugawara et al. | |
| 7,564,435 B2 * | 7/2009 | Nakamura et al. | 345/87 |
| 2009/0290130 A1 | 11/2009 | Nishimura et al. | |
| 2010/0066981 A1 | 3/2010 | Kato | |
| 2010/0079731 A1 | 4/2010 | Okada | |

FOREIGN PATENT DOCUMENTS

| | | |
|---|---|---|
| JP | 2000-194072 A | 7/2000 |
| JP | 2004-157356 A | 6/2004 |
| JP | 2006-293120 A | 10/2006 |
| JP | 2008-076863 A | 4/2008 |
| JP | 2008-090062 A | 4/2008 |
| JP | 2008-090161 A | 4/2008 |
| JP | 2008-250043 A | 10/2008 |

OTHER PUBLICATIONS

International Search Report in PCT/JP2009/056137 dated May 26, 2009 (English Translation Thereof).

* cited by examiner

*Primary Examiner* — Tony Ko
*Assistant Examiner* — Magda Cruz
(74) *Attorney, Agent, or Firm* — McGinn IP Law Group, PLLC

(57) ABSTRACT

Provided is a method for controlling a cooling device that includes pump (1) having pump characteristics defined by a relationship between the number of revolutions and a pressure value, and cooling fan (5), and the cooling device cools an object to be cooled by a cool wind generated by injecting air compressed by pump (1) and a cooling wind of cooling fan (5). The method includes: preparing beforehand a first parameter to associate an altitude with a change rate d of a gradient of the pump characteristics at one altitude with respect to a gradient of the pump characteristics at another altitude; and controlling the numbers of revolutions of pump (1) and cooling fan (5) based on an altitude calculated from the first parameter and the change rate d.

14 Claims, 6 Drawing Sheets

Fig.4
(a)
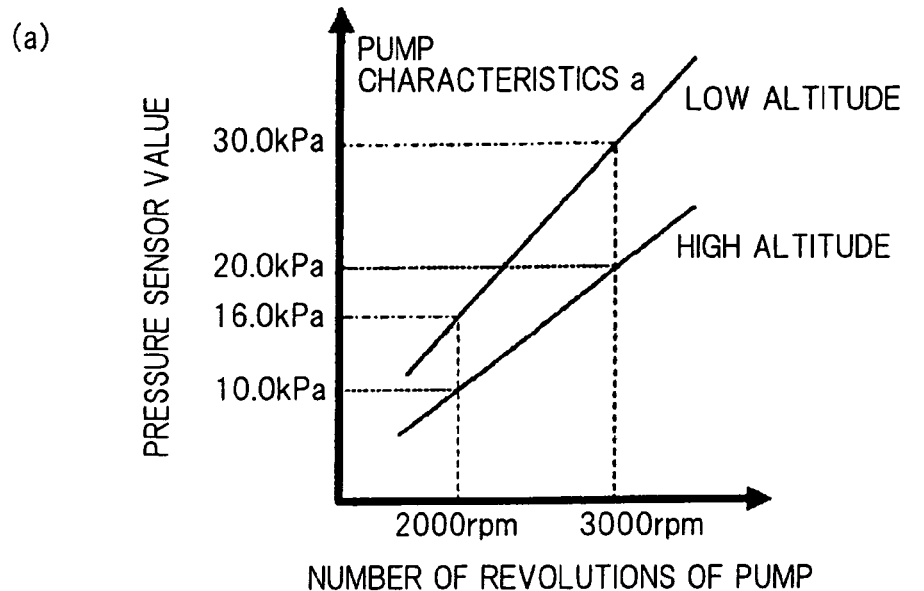
(b)
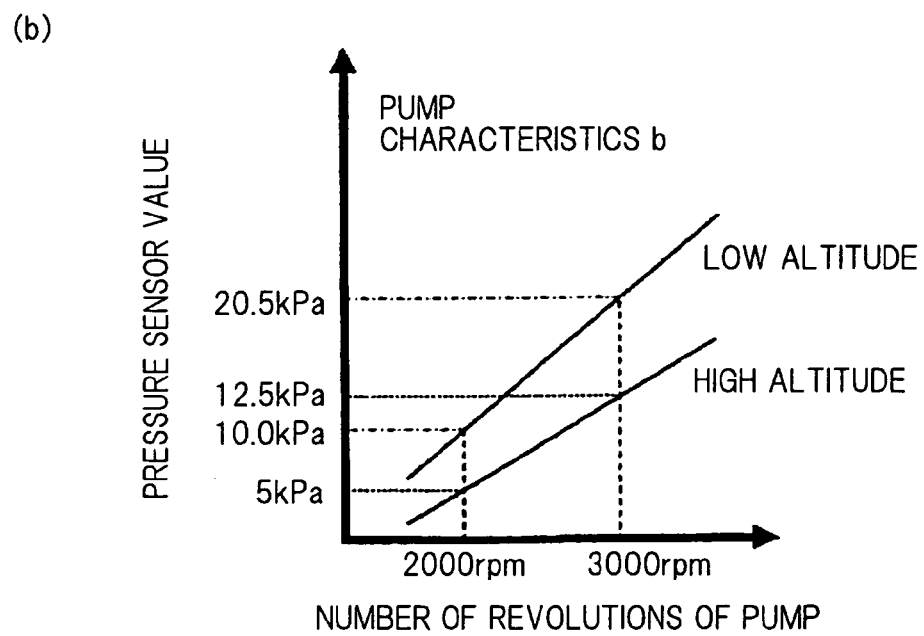

METHOD FOR CONTROLLING COOLING DEVICE, COOLING DEVICE, AND PROJECTION-TYPE DISPLAY DEVICE

TECHNICAL FIELD

The present invention relates to a method for controlling a cooling device that cools an object to be cooled by air compressed by a pump to be injected and a cooling wind generated by a cooling fan, the cooling device, and a projection-type display device including the cooling device.

BACKGROUND ART

For a projection-type display device (projector) that includes a lamp unit, cooling is essential to secure performance and reliability. To cool an object to be cooled such as a light source lamp that is a heating element, conventionally, in the projection-type display device, there has widely been used a method for discharging heat from the device by a cooling fan or supplying a cooling wind to the object to be cooled.

For example, Patent Document 1 discusses a projector that includes, in addition to a cooling fan, a cooling device configured to cool a heating element by blowing air compressed by a pump to the heating element. The light-source lamp cooling device discussed in Patent Document 1 includes a pump that compresses air, an injection unit that injects the compressed air, and a pipe that connects a gap compressor to the injection unit. In the device discussed in Patent Document 1, to prevent reduction in the amount of air that is injected caused by clogging of injection holes of the injection unit with dust, which in turn sets the light source lamp in an overheated state, control is performed to detect pressure in the pipe and turn the light source lamp off when the pressure in the pipe reaches a predetermined value or more.

Patent Document 2 discusses a projector that includes an air pump. The projector discussed in Patent Document 1 includes an air discharge unit that injects compressed air to a light source, and a tube that is a storage unit to store the compressed air. In the device discussed in Patent Document 2, control is performed in such a manner that the amount of air in the tube is increased by the air pump to increase the flow rate of air discharged from the air discharge unit when pressure in the tube is lower than a target value, and such that the amount of air in the tube is decreased by the air pump to reduce the flow rate of air discharged from the air discharge unit when the pressure in the tube is higher that the target value. This control enables prevention of overheating of the light source by keeping the flow rate of air constant for the light source.

Thus, conventionally, in the projector that includes the pump configured to inject the compressed air, highly accurate control is performed for the pump. In cooling by the pump, a certain level of cooling performance is acquired by utilizing a gauge manometer not affected by atmospheric pressure.

In the case of the abovementioned cooling method that uses air as a cooling medium, cooling performance of the pump and the cooling fan are affected by atmospheric pressure. In other words, when the projector is used in an environment of a high altitude, the air density becomes low due to low atmospheric pressure, and hence the object to be cooled may not be sufficiently cooled even when cooling control similar to that at a low altitude is performed. The current projector therefore has a cooling mode exclusive to a high altitude. When the projector is used at a high altitude, a user himself switches a cooling mode to that for the high altitude. However, in the method having its cooling control dependent on the user, it is difficult to completely implement cooling that takes a difference in altitude into consideration.

Thus, atmospheric pressure must be detected, and cooling control corresponding to the air density at this atmospheric pressure must be performed. Patent Document 3 discuses a projection-type display device that employs a method for directly measuring atmospheric pressure by using an absolute manometer such as Torricelli tube barometer or an aneroid barometer.

[Patent Document 1] JP2008-90062A
[Patent Document 2] JP2008-90161A
[Patent Document 3] JP2000-194072A

Disclosure of the Invention

In Patent Documents 1 and 2, the gauge manometer is used as a pressure measuring sensor. However, the gauge manometer cannot directly measure atmospheric pressure to calculate an altitude because it is a sensor that is used to detect the difference from the atmospheric pressure. Installation of the gauge manometer to directly measure the atmospheric pressure leads to a cost increase.

In the projectors discussed in Patent Documents 1 and 2, no carefully planned control is implemented for the cooling fan while highly accurate control is performed for the pump.

It is therefore an object of the present invention is to provide a method for controlling a cooling device, which can highly accurately control cooling according to the altitude without adding any new components, the cooling device, and a projection-type display device.

Solution to Problem

To achieve the object of the present invention, a method for controlling a cooling device that includes a pump configured to compress air and having pump characteristics defined by the relationship between the number of revolutions of the pump and a pressure value of the pump, and a cooling fan, and that cools an object to be cooled by a cool wind generated by injecting the air compressed by the pump and by discharging air from the device by the cooling fan, includes: preparing beforehand a first parameter to associate an altitude with a change rate d of a gradient of the pump characteristics at one altitude with respect to a gradient of the pump characteristics at another altitude; and controlling the numbers of revolutions of the pump and the cooling fan based on an altitude calculated from the first parameter and the change rate d.

According to the present invention, the first parameter to associate the altitude with the change rate d of the gradient of the pump characteristics at one altitude with respect to the gradient of the pump characteristics at another altitude is prepared beforehand.

According to the present invention, the altitude is calculated based on the change rate d and the first parameter prepared beforehand. This enables calculation of the altitude (atmospheric pressure) by a relative pressure gauge without using any absolute manometer. According to the present invention, based on the acquired atmospheric pressure, the numbers of revolutions of not only the pump but also the cooling fan can be highly accurately controlled according to the altitude.

According to the present invention, the change rate d of the gradient of the pump characteristics is used for calculating the altitude. This change rate d is not affected by an individual difference or aged deterioration of the pump. Hence, as a parameter to calculate the altitude from a pressure value, it is only necessary to prepare one type of a first parameter for associating the altitude (atmospheric pressure) with the change rate d of the gradient of the pump characteristics.

According to the present invention, cooling performance can be highly accurately performed according to altitude without adding any new components.

BRIEF DESCRIPTION OF THE DRAWINGS

FIGS. 4A and 4B are graphs that each show the relationship between the number of revolutions of a pump and a pressure sensor value.

BEST MODE FOR CARRYING OUT INVENTION

Projection-Type Display Device

Next, embodiments of the present invention are described with reference to the drawings.

Figure 1:
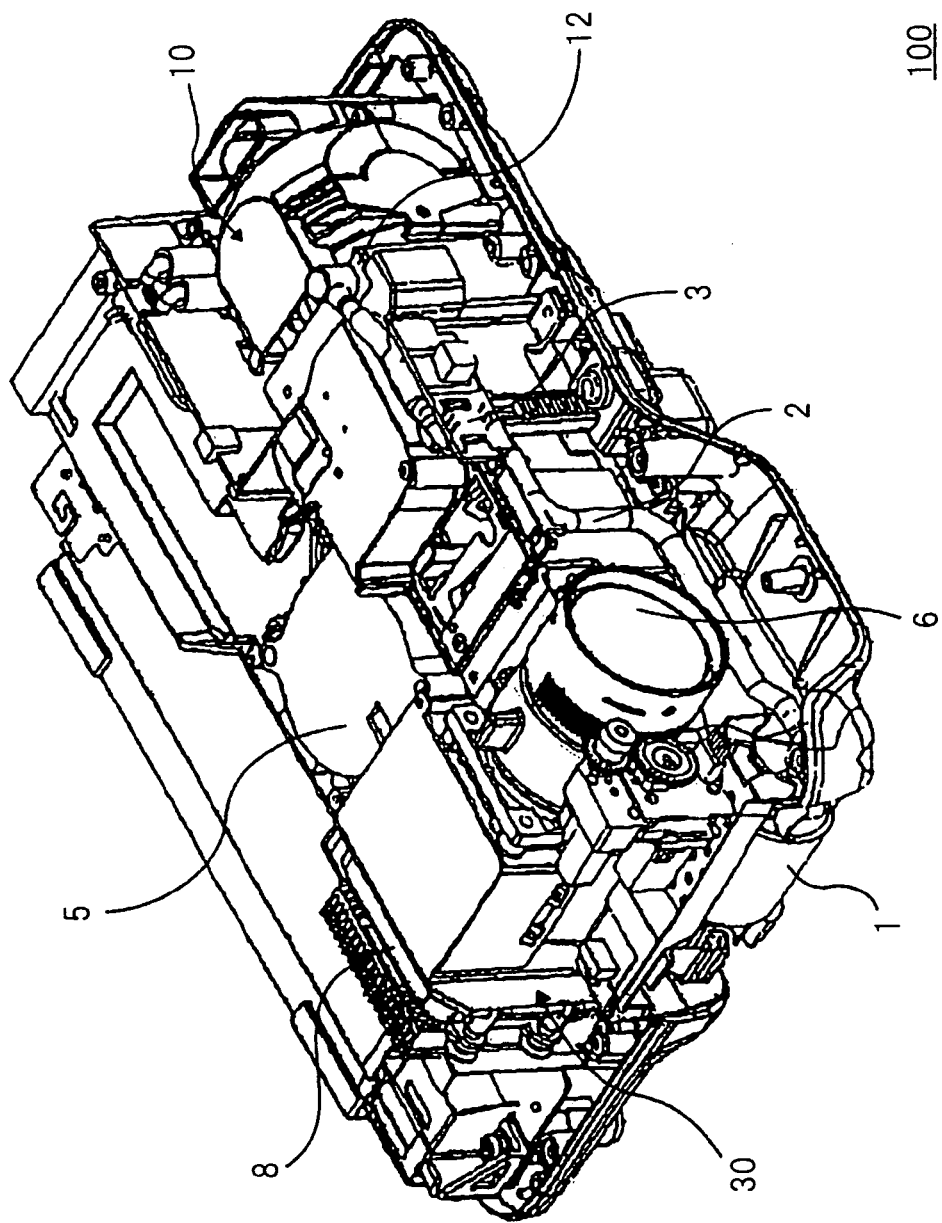
FIG. 1 is a perspective view that shows a projection-type display device according to an embodiment of the present invention.
Figure 2:
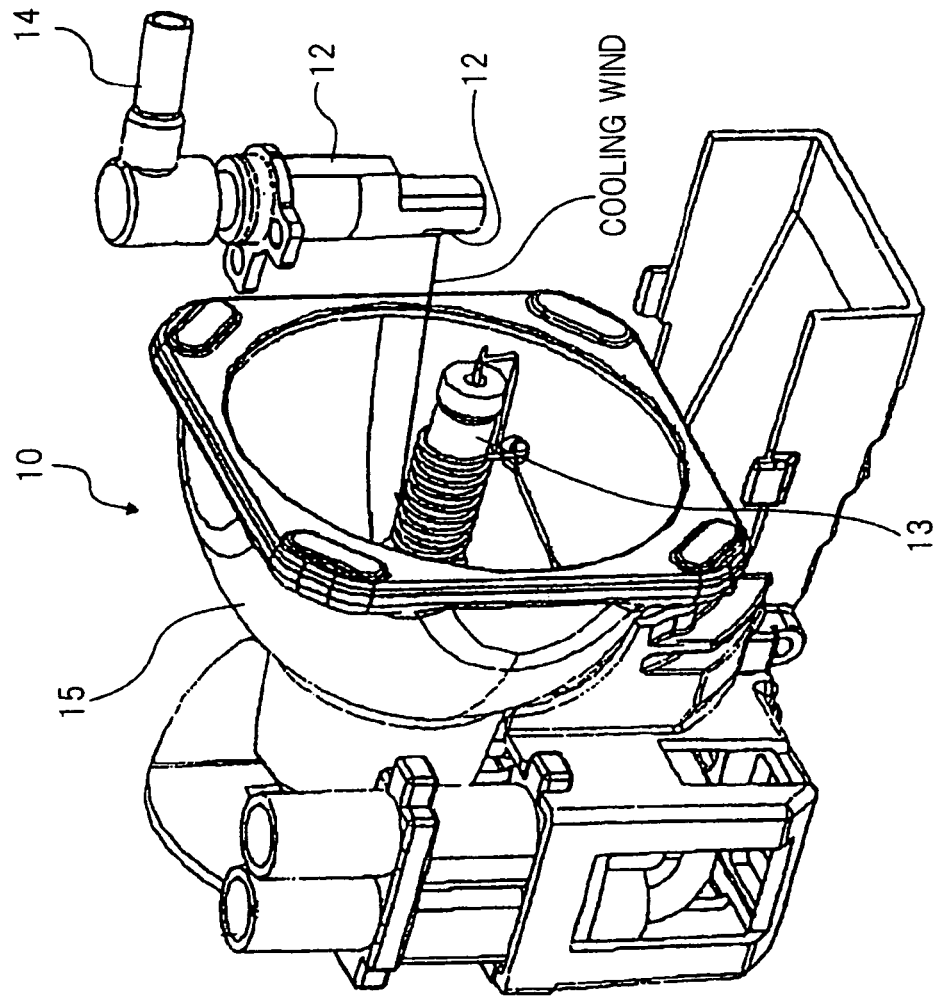
FIG. 2 is an exploded perspective view that shows the present invention where a reflector holding member of a lamp unit is removed.
Figure 3:
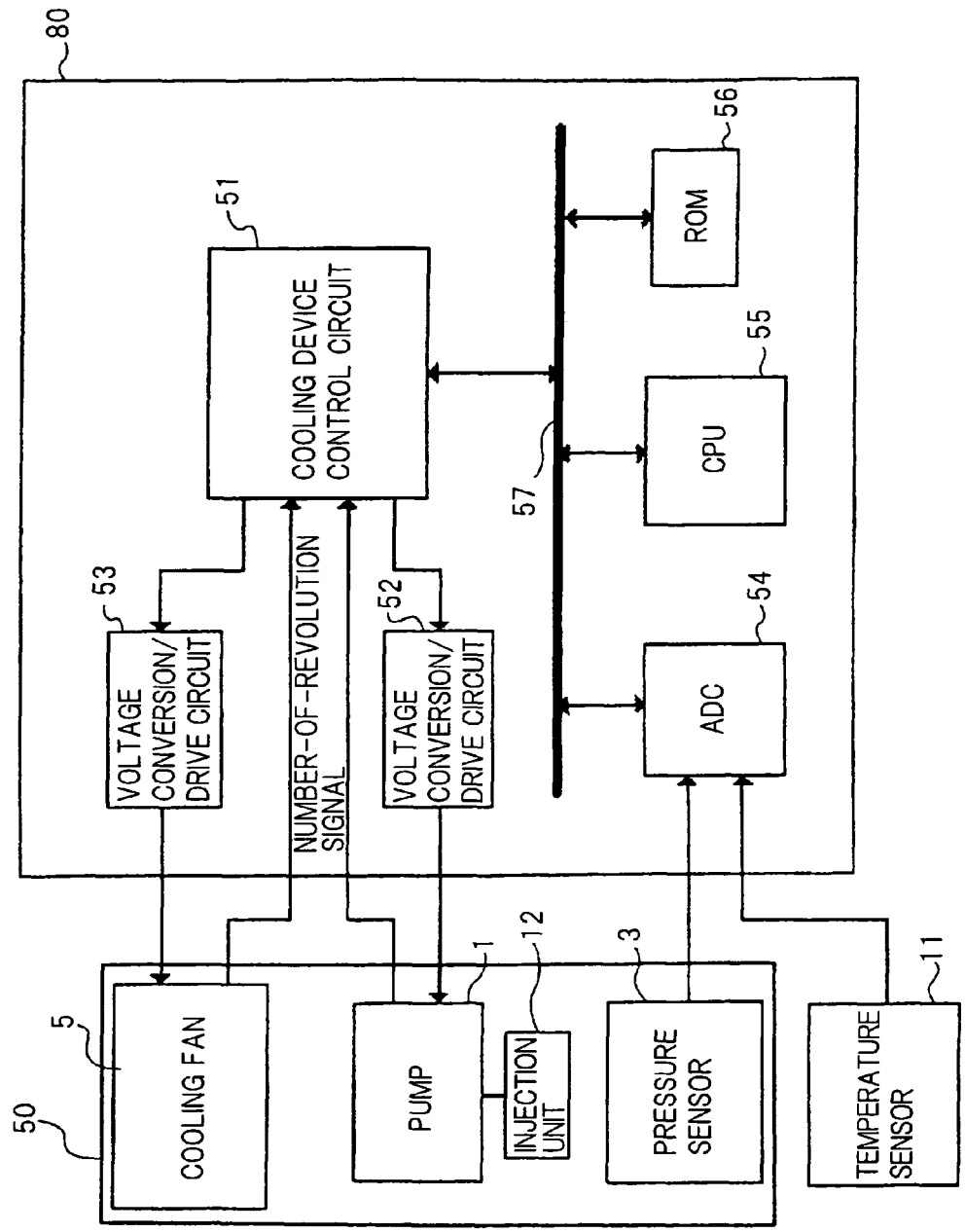
FIG. 3 is a block diagram that shows a control unit of the projection-type display device according to the present invention.
Figure 5:
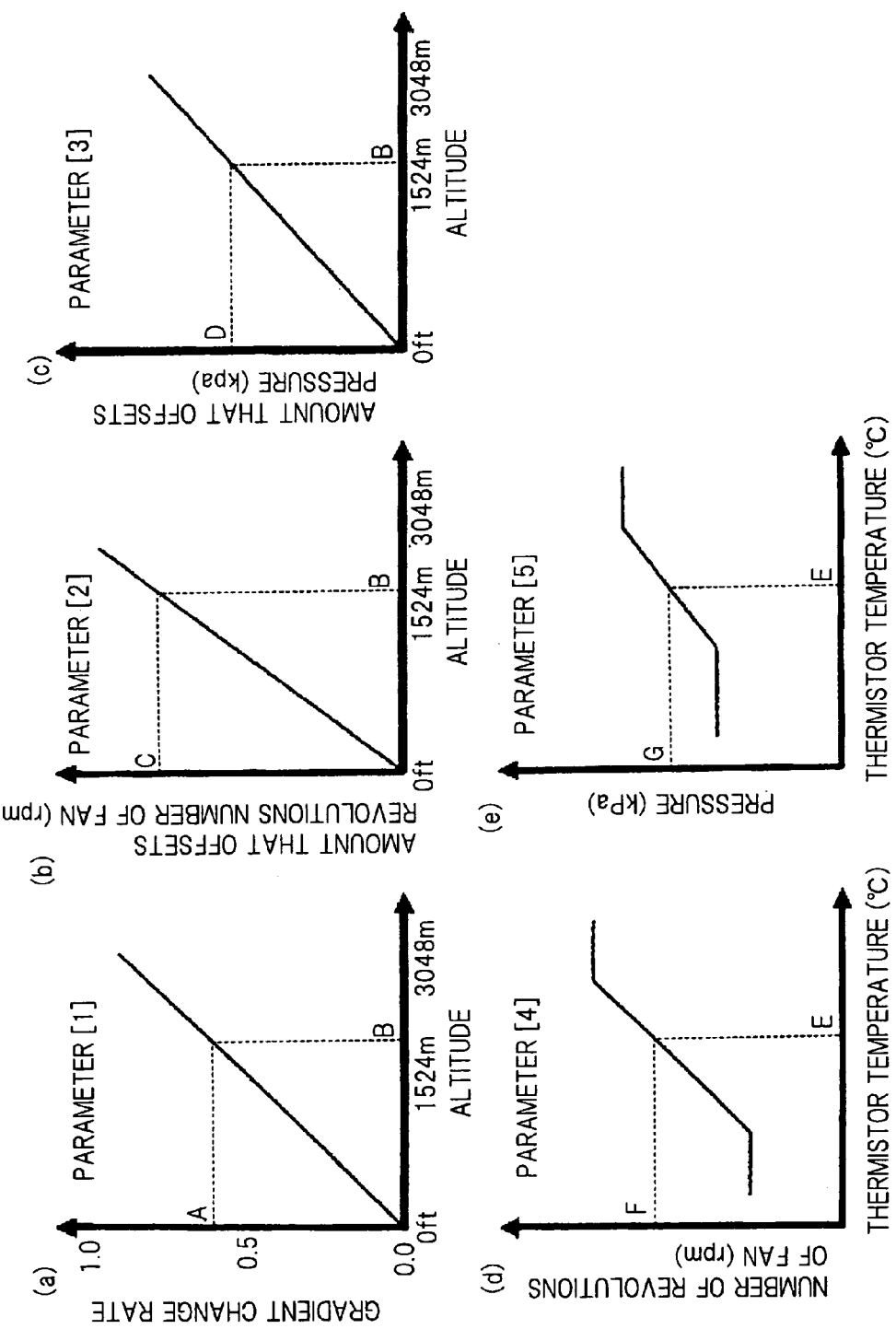
FIGS. 5A to 5E are explanatory graphs that each show the parameter used for a control method according to the present invention.

FIG. 1 is a perspective view showing a projection-type display device in a state in which the case of the upper part has been removed according to an embodiment of the present invention. FIG. 2 is an exploded perspective view showing the present invention where a reflector holding member of a lamp unit is removed. FIG. 3 is a block diagram showing a control unit of the projection-type display device according to the embodiment.

Projection-type display device (also referred to as projector) 100 according to the embodiment includes lamp unit 10, optical unit 30, cooling device 50, and control unit 80.

Lamp unit 10 includes luminous tube 13 and reflector 15. Reflector 15 reflects light emitted from luminous tube 13 to converge on a focus, and is positioned to be held by a reflector holding member (not shown).

Optical unit 30 includes DMD (Digital Micromirror Device) 8 that is an image forming element and a reflective optical modulation device, an illumination optical system that illuminates DMD 8, and projection lens 6 that projects a flux of light from DMD 8 onto a screen.

The illumination optical system includes a color wheel, a rod integrator, and an afocal optical system (not shown). The color wheel divides light from lamp unit 10 into a plurality of colors in time. The rode integrator is an uneven luminance reduction element that makes uniform a luminance distribution of the flux of light from lamp unit 10 to emit it from an exist surface. The afocal optical system includes a plurality of lenses and a flat mirror, and guides the flux of light emitted from the rod integrator to DMD 8. An image display has been described by way of the DMD. However, cooling device 50 according to the present invention can similarly be used even for a liquid crystal display device.

Cooling device 50 includes pump 1, cooling fan 5, injection unit 12, and pressure sensor 3.

For pump 1, a compact air compressor that can generate air can be suitably used. For example, a reciprocating compressor is used. There are piston-type and diaphragm-type reciprocating compressors, both of which can be applied to the present invention. However, the diaphragm type is advantageous in terms of miniaturization. The diaphragm type includes a type that has one diaphragm and a type that has a plurality of diaphragms. As the number of diaphragms is greater, the size is smaller and noise is lower. In order to reduce the wavelength and amplitude, thereby suppressing pulsation of discharged air, pump 1 is controlled to be driven at a relatively high frequency. An axial-flow fan is used for cooling fan 5. Heat generated in lamp unit 10 is discharged from the device to the outside. Pump 1 and cooling fan 5 are controlled to be driven by control unit 80. A control method is described in detail below.

Injection unit 12 includes connector 14 and very small hole 11, and is held by the reflector holding member (not shown). One end of silicon tube 2 is connected to connector 14, and the other end of silicon tube 2 is connected to pump 1. From very small hole 11 formed in injection unit 12, a cooling wind supplied from pump 1 via silicon tube 2 is blown out. The cooling wind from very small hole 11 is blown out toward luminous tube 13, and luminous tube 13 is cooled by the cooling wind.

Pressure sensor 3 is a gauge pressure sensor (relative pressure gauge) that detects the difference of pressure from atmospheric pressure, and detects air pressure generated by pump 1 in silicon tube 2. The pressure detected by pressure sensor 3 is converted into an electric signal to be transmitted to control unit 80.

Control unit 80 includes cooling device control circuit 51, voltage conversion/drive circuit 52 for pump 1, voltage conversion/drive circuit 53 for cooling fan 5, ADC (Analog/Digital Converter) 54, CPU (Central Processing Unit) 55, and ROM (Read-Only Memory) 56.

Signals regarding the numbers of revolution from pump 1 and cooling fan 5, and signals regarding pressure and temperature from pressure sensor 3 and temperature sensor 16 via ADC 54 are input to cooling device control circuit 51. Cooling device control circuit 51 outputs, based on the input signals, control signals for driving pump 1 and cooling fan 5 respectively to voltage conversion/drive circuit 52 and voltage conversion/drive circuit 53.

Voltage conversion/drive circuit 52 generates a voltage based on the control signal input from cooling device control circuit 51, and controls the number of driving revolutions of pump 1. Voltage conversion/drive circuit 53 generates a voltage based on the control signal input from cooling device control circuit 51, and controls the number of driving revolutions of cooing fan 5.

ADC 54 is an IC (Integrated Circuit) that converts analog signals input from pressure sensor 3 and temperature sensor 16 into digital signals. ROM 56 stores various data in addition to parameters described below. CPU 55 is used, for example, for monitoring the number of revolutions so that cooling fan 5 can always be set to the target number of revolutions to perform feedback control, or monitoring pressure so that pump 1 can always be set to target pressure to perform feedback control. ADC 54, CPU 55, ROM 56, and cooling device control circuit 51 are interconnected by communication bus 57.

(Method for Controlling Cooling Device)

Figure 6:
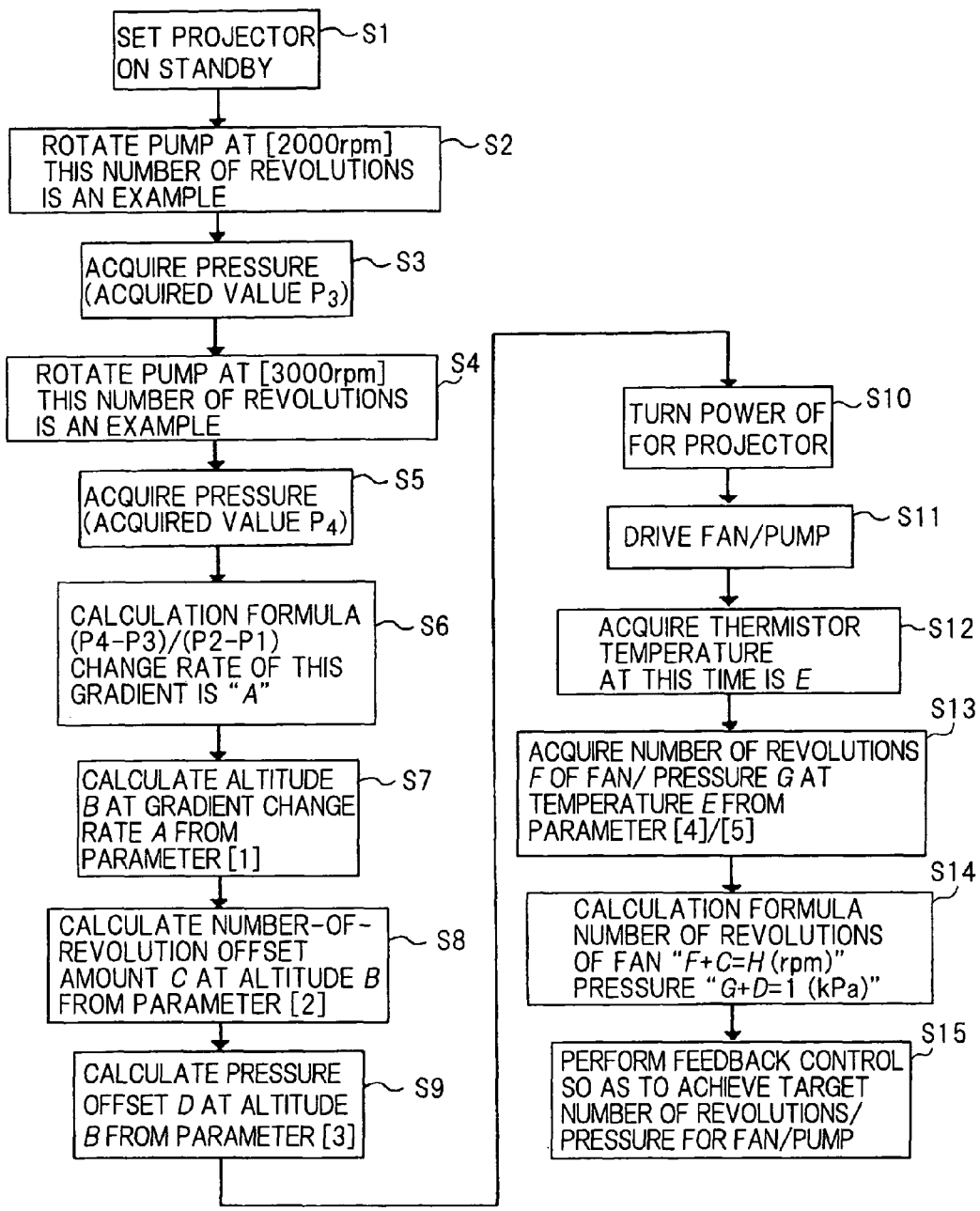
FIG. 6 is an explanatory flowchart that shows the control flow of a cooling device according to the present invention.

Next, referring to FIGS. 3 to 6, a method for controlling the cooling device in the projection-type display device according to the embodiment is described. FIGS. 4A and 4B are graphs each showing the relationship between the number of revolutions of the pump and a pressure sensor value. FIGS. 5A to 5E are explanatory graphs each showing a parameter used for the control method according to the present invention. FIG. 6 is an explanatory flowchart showing a control flow of the cooling device according to the present invention.
(Principle of Altitude Calculation Method)

First, a principle of an atmospheric pressure detection method of pressure sensor 3 according to the embodiment is described. "Pump characteristics" hereinafter are defined by the relationship between the number of revolutions of the pump and a pressure value of the pump.

According to the embodiment, the change rate of a gradient of pump characteristics is utilized to calculate an altitude by a gauge manometer while eliminating the influence of an individual difference or aged deterioration of the pump.

Referring to FIG. 4A, calculation of an altitude by the gauge manometer for one pump having specific pump characteristics is discussed. The pump shown in FIG. 4A has pump characteristics a.

When air is extruded from diaphragms equal in capacity into silicon tube 2, pressure values detected in silicon tube 2 are different between a case where ambient air density is high (low altitude) and a case where air density is low (high altitude). In other words, the difference in air density is detected as a pressure value difference. For example, a pressure sensor value at a low altitude at 2000 rpm is 16.0 kPa, while a pressure sensor value at a high altitude at the same number of revolutions is 10.0 kPa. Thus, when pump 1 has pump characteristics a, if pump 1 is rotated at 2000 rpm, a difference of 6 kPa is generated between the high altitude and the low altitude. Atmospheric pressure can be calculated based on this pressure difference.

However, when atmospheric pressure is measured only based on the reduction rate of pressure when the pump is simply rotated by one revolution number to calculate and use an altitude, there is the influence of "individual variance among a plurality of pumps" or "aged deterioration of pump performance". For example, when the pump changes from the pump characteristics a to pump characteristics b shown in FIG. 4B due to the influence of the individual difference of the pump or the aged deterioration of the pump, atmospheric pressure cannot be accurately calculated. When pump 1 has the pump characteristics b shown in FIG. 4B, the pressure sensor value at a low altitude at 2000 rpm is 10.0 kPa, while the pressure sensor value at a high altitude at the same number of revolutions is 5.0 kPa. In other words, in the case of pump characteristics a, a difference of 6 kPa has been generated. However, because of the change of pump 1 to the pump characteristics b, only a difference of 5 kPa is generated between the high altitude and the low altitude, and hence atmospheric pressure cannot be accurately calculated. Thus, when an altitude is calculated based on a pressure value at one specific revolution number, a plurality of parameters must be set according to individual pump characteristics.

Thus, according to the embodiment, to calculate an altitude by the gauge manometer while eliminating the influence of the individual difference of the pump or the aged deterioration of the pump, a pressure change amount (relative value) when the pump is rotated at two revolution numbers (e.g., 2000 o rpm and 3000 rpm) is utilized.

As shown in FIG. 4A, when pump 1 is driven at two arbitrary types of revolution numbers (e.g., 2000 rpm and 3000 rpm), how pressure changes in silicon tube 2 varies depending on atmospheric pressure. In other words, pump characteristics defined by a relationship between the number of revolutions of the pump and the pressure value of the pump are different between the low altitude and the high altitude. This means that a gradient of the pump characteristics at high altitude changes with respect to that of the pump characteristics at low altitude. This change rate is fixed without being affected by the individual difference of the pump. According to the embodiment, therefore, an altitude is calculated by the gauge manometer by using the change rate of the gradient while eliminating the influence of the individual difference of the pump or the aged deterioration of the pump.

A method for calculating a change rate of a gradient of the pump characteristics is described below. A change rate d of a gradient of the pump characteristics is represented by the following calculation formula (1):

$$d=(P_4-P_3)/(P_2-P_1) \tag{1}$$

$P_1$: pressure value on first driving condition of pump 1 at reference altitude
$P_2$: pressure value on second driving condition of pump 1 at reference altitude
$P_3$: pressure value on first driving condition of pump 1 at another altitude different from reference altitude
$P_4$: pressure value on first driving condition of pump 1 at another altitude The change rate d of the gradient of the pump characteristics is not affected even when the pump characteristics are different. Thus, concerning the parameter to calculate the altitude from a pressure value, only one type needs to be prepared as long as a parameter to associate an altitude (atmospheric pressure) with the change rate d of the gradient of the pump characteristics is used.

Next, referring to FIGS. 4A and 4B, the case where the parameter to associate the altitude (atmospheric pressure) with the change rate d of the gradient of the pump characteristics is not affected by the individual difference of the pump or the aged deterioration of the pump is specifically described.

In the case of the pump characteristics a shown in FIG. 4A,
low altitude: 2000 rpm, 16.0 kPa ($P_1$)
low altitude: 3000 rpm, 30.0 kPa ($P_2$)
high altitude: 2000 rpm, 10.0 kPa ($P_3$)
high altitude: 3000 rpm, 20.0 kPa ($P_4$)
A change rate da of a gradient of the pump characteristics a is represented by the following formula:

$$da = ((P_4 - P_3)/(P_2 - P_1)$$
$$= (20.0 \text{ [kPa]} - 10.0 \text{ [kPa]})/(30.0 \text{ [kPa]} - 16.0 \text{ [kPa]})$$
$$= 10.0 \text{ [kPa]}/[14.0 \text{ [kPa]}$$
$$= 0.71$$

In the case of the pump characteristics b shown in FIG. 4B,
low altitude: 2000 rpm, 10.0 kPa ($P_1$)
low altitude: 3000 rpm, 20.5 kPa ($P_2$)
high altitude: 2000 rpm, 5.0 kPa ($P_3$)
high altitude: 3000 rpm, 12.5 kPa ($P_4$)
A change rate db of a gradient of the pump characteristics b is represented by the following:

$$db = ((P_4 - P_3)/(P_2 - P_1)$$
$$= (12.5 \text{ [kPa]} - 5.0 \text{ [kPa]})/(20.5 \text{ [kPa]} - 10.0 \text{ [kPa]})$$
$$= 7.5 \text{ [kPa]}/[10.5 \text{ [kPa]}$$
$$= 0.71$$

The calculation results show that the change rate da of the gradient of the pump characteristics a and the change rate db of the gradient of the pump characteristics b are equal to each other, namely, 0.71. The change rate is constant between the low altitude and the high altitude even when the pump characteristics are different, and hence according to the embodiment, atmospheric pressure can be accurately calculated without being affected by the individual difference of the pump or the aged deterioration of the pump. In other words, concerning a parameter to associate the altitude (atmospheric pressure) with the change rate d of the gradient of the pump characteristics, only one type needs to be prepared without being affected by the individual difference or aged deterioration of the pump as shown in FIG. 5A. It can be understood from FIG. 5A that as long as the change rate d of the gradient of the pump characteristics is known, an altitude can be uniquely calculated without taking the individual difference or the aged deterioration of the pump into consideration.

As described above, according to the embodiment, the altitude is calculated based on the parameter prepared beforehand and the change rate d. Hence, the altitude can be calculated even when the device includes only a relative pressure gauge while including no absolute manometer. According to the embodiment, the change rate of the gradient of the pump characteristics that becomes a fixed value even when the pump characteristics are different is used for calculating the altitude. As a result, the altitude (atmospheric pressure) can be accurately calculated without being affected by the individual difference of the pump or the aged deterioration of the pump.

(Method for Controlling Cooling Device)

Next, referring to FIGS. 5A to 5E and FIG. 6, a method for controlling the cooling device is described.

The two revolution numbers described above are arbitrary. Hereinafter, however, the numbers of revolutions are respectively set to "2000 rpm" and "3000 rpm".

<Calibration of Cooling Device>

First, characteristics in a shipping state (low altitude) of projection-type display device 100 are acquired. In other words, pressure $P_1$ at 2000 rpm and pressure $P_2$ at 3000 rpm when pump 1 is driven at the low altitude are acquired, and stored in ROM 56.

<Description of Parameter>

Referring to FIGS. 5A to 5E, parameters used in the cooling device control method according to the embodiment are described.

Parameter [1]: parameter to associate altitude (atmospheric pressure) with the change rate of the gradient with respect to reference (low altitude) characteristics, shown in FIG. 5A Parameter [2]: offset amount of cooling fan 5 with respect to the altitude (the number of revolutions compensated for at high altitude with respect to conditions at low altitude), shown in FIG. 5B Parameter [3]: offset amount of control pressure of pump 1 with respect to altitude (the number of revolutions compensated for at high altitude with respect to conditions at low altitude), shown in FIG. 5C Parameter [4]: preset control specifications of environmental temperature and number of revolutions of cooling fan 5, shown in FIG. 5D Parameter [5]: preset control specifications of environmental temperature and pressure of pump 1, shown in FIG. 5E These parameters [1] to [5] are stored in ROM 56.

<Description of Control Flow>

Next, referring to FIG. 6, a control flow of cooling device 50 executed by control unit 80 is described.

When a power-on trigger is input from a projector standby state (step S1), cooling device control circuit 51 outputs a control signal to drive voltage conversion/drive circuit 52 to drive pump 1 at 2000 rpm. Pump 1 is accordingly driven at 2000 rpm (step S2), and pressure at this time is acquired by pressure sensor 3. The pressure is set to $P_3$ (step S3). Then, pump 1 is driven at 3000 rpm (step S4), and pressure at this time is acquired. The pressure is set to $P_4$ (step S5). The acquired values $P_3$ and $P_4$ are converted into digital signals by ADC 54, transferred to ROM 565 via communication bus 57, and stored in ROM 56.

CPU 55 then calculates, based on the values acquired by the measurement, the change rate d of a gradient of pump characteristics by the following formula (step S6):

$$d = ((P_4 - P_3)/(P_2 - P_1))$$

More specifically, a value of the change rate d of the gradient acquired as a result of the measurement is set to "A" as shown in FIG. 5A. By using the parameter [1] stored in ROM 56, the altitude at the change rate "A" of the gradient is calculated. As shown in FIG. 5B, the altitude is set to "B" (step S7) to be stored in ROM 56.

Then, by using the parameter [2], an offset revolution number of cooling fan 5 at the altitude "B" is acquired. As shown in FIG. 5B, this value is set as amount "C" (rpm) (step S8), that offsets the number of revolutions of the fan, to be stored in ROM 56.

By using the parameter [3], offset pressure of pump 1 at the altitude "B" is acquired. As shown in FIG. 5C, this value is set as amount "D" (kPa) (step S9), that offsets a pressure of the pump. The amount "C" and the amount "D" are stored in ROM 56.

After the end of step S9, the projector is activated (step S10), cooling fan 5 and pimp 1 are driven, and luminous tube 13 of lamp unit 10 is lit (step S11).

A current environmental temperature is then acquired by temperature sensor 16. This value is set to "E" (step S12). As shown in FIG. 5D, by using the parameter [4], a target number of revolutions "F" of cooling fan 5 at the current environmental temperature "E" at the low altitude is acquired. This number of fan revolutions is set to "F" (rpm). As shown in FIG. 5E, by using the parameter [5], target pressure "G" of pump 1 at the current environmental temperature "E" at the low altitude is acquired. This pressure value is set to "G" (kPa) (step S13). These acquired values "E", "F", and "G" are all stored in ROM 56.

A final target number of revolutions/pressure is then calculated by adding an offset value (correction value) at a current altitude to the target value at the low altitude. Specifically, CPU 55 calculates a target number of revolutions "H" of cooling fan 5 at a high altitude and target pressure "I" of pump 1 at the high altitude by the following formula (step S14):

$$H(\text{rpm}) = F + C$$

$$I(\text{kPa}) = G + D$$

CPU 55 performs feedback control so as to achieve a final target number of revolutions "H" and final target pressure "I" (step S15).

Atmospheric pressure is detected (offset amount is determined) only once at the time of activation. However, a temperature is periodically detected even during an operation to update the target value.

Linear control based on the atmospheric pressure has been described. However, gradual control can also be performed.

Projection-type display device 100 according to the present invention can detect a currently used altitude (atmospheric pressure), and therefore can achieve the following control/function based on the atmospheric pressure information.

For example, when cooling device control circuit 51 has two or more types of cooling modes, the modes can be automatically switched based on the atmospheric pressure.

Information (atmospheric pressure/temperature/humidity/dust) as regards an environment in which projection-type display device 100 is used, can be stored in ROM 56. The information as regards the environment in which a projection-type display device is used and that is stored in ROM 56 can be used for analysis when projection-type display device 100 fails to operate. Based on information such as atmospheric pressure/temperature/humidity/date (season) as the information with respect to an environment in which projection-type display device 100 is used, CPU 55 can determine a city (country) where projection-type display device 100 is used to automatically change the display language on a menu.

Moreover, based on a change in atmospheric pressure, CPU 55 can forecast weather to display the forecast result on the screen.

EXPLANATION OF REFERENCE NUMERALS

1 pump
2 silicon tube
3 pressure sensor
5 cooling fan
6 projection lens
8 DMD
10 lamp unit
11 very small hole
12 injection unit
13 luminous tube
14 connector
15 reflector
16 temperature sensor
30 optical unit
50 cooling device
51 cooling device control circuit
52, 53 drive circuit
57 communication bus
80 control unit
100 projection-type display device

The invention claimed is:

1. A method for controlling a cooling device that includes a pump configured to compress air and having pump characteristics defined by a relationship between the number of revolutions of the pump and a pressure value of the pump; and a cooling fan; and the cooling device cools an object to be cooled by a cool wind generated by injecting the air compressed by the pump and by discharging air from the device by the cooling fan, comprising:
preparing beforehand a first parameter to associate an altitude with a change rate d of a gradient of the pump characteristics at one altitude with respect to a gradient of the pump characteristics at another altitude; and
controlling the numbers of revolutions of the pump and the cooling fan based on an altitude calculated from the first parameter and the change rate d.

2. The method for controlling the cooling device according to claim 1, wherein the change rate d is calculated by the following formula (I):

$$d=(P_4-P_3)/(P_2-P_1) \quad (1)$$

$P_1$: pressure value on first driving condition of the pump at reference altitude
$P_2$: pressure value on second driving condition of the pump at reference altitude
$P_3$: pressure value on first driving condition of the pump at another altitude different from reference altitude
$P_4$: pressure value on second driving condition of the pump at another altitude different from reference altitude.

3. The method for controlling the cooling device according to claim 2, further comprising:
preparing beforehand a second parameter to associate the altitude with a difference of the number of revolutions of the cooling fan at one altitude from that of the cooling fan at another altitude, a third parameter to associate the altitude with a difference of pressure generated by the pump at one altitude from that generated by the pump at another altitude, a fourth parameter to associate the number of revolutions of the cooling fan with an environmental temperature, and a fifth parameter to associate the pressure generated by the pump with the environmental temperature;
acquiring the difference in number of revolutions based on the altitude calculated from the first parameter and the change rate d acquired by the measurement, and the second parameter, and driving the cooling fan by setting, as the target number of revolutions, the number of revolutions acquired by adding the number of revolutions of the cooling fan acquired by using the fourth parameter to the difference in number of revolutions; and
acquiring the pressure difference based on the altitude calculated from the first parameter and the change rate d acquired by the measurement, and the third parameter, and driving the pump by setting, as target pressure, pressure acquired by adding pressure acquired by using the fifth parameter and generated by the pump to said pressure difference.

4. The method for controlling the cooling device according to claim 2, wherein the pressure generated by the pump is measured by a gauge manometer.

5. The method for controlling the cooling device according to claim 1, further comprising:
preparing beforehand a second parameter to associate the altitude with a difference of the number of revolutions of the cooling fan at one altitude from that of the cooling fan at another altitude, a third parameter to associate the altitude with a difference of pressure generated by the pump at one altitude from that generated by the pump at another altitude, a fourth parameter to associate the number of revolutions of the cooling fan with an environmental temperature, and a fifth parameter to associate the pressure generated by the pump with the environmental temperature;
acquiring the difference in number of revolutions based on the altitude calculated from the first parameter and the change rate d acquired by the measurement, and the second parameter, and driving the cooling fan by setting, as the target number of revolutions, the number of revolutions acquired by adding the number of revolutions of the cooling fan acquired by using the fourth parameter to the difference in number of revolutions; and
acquiring the pressure difference based on the altitude calculated from the first parameter and the change rate d acquired by the measurement, and the third parameter, and driving the pump by setting, as target pressure, pressure acquired by adding pressure acquired by using the fifth parameter and generated by the pump to said pressure difference.

6. The method for controlling the cooling device according to claim 5, wherein the pressure generated by the pump is measured by a gauge manometer.

7. The method for controlling the cooling device according to claim 1, wherein the pressure generated by the pump is measured by a gauge manometer.

8. A cooling device comprising:
a pump configured to compress air and having pump characteristics defined by a relationship between the number of revolutions of the pump and a pressure value of the pump;
an injection unit configured to inject the air compressed by the pump;
a cooling fan;
a pressure sensor configured to detect pressure generated by the pump as gauge pressure;
a control unit configured to control the numbers of revolutions of the pump and the cooling fan; and
a storage unit,
wherein the storage unit stores beforehand a first parameter to associate an altitude with a change rate d of a gradient of the pump characteristics at one altitude with respect to a gradient of the pump characteristics at another altitude; and
the control unit controls the numbers of revolutions of the pump and the cooling fan based on an altitude calculated from the first parameter and the change rate d.

9. The cooling device according to claim 8, wherein the control unit calculates the change rate d by the following formula (I):

$$d=(P_4-P_3)/(P_2-P_1) \quad (1)$$

$P_1$: pressure value on first driving condition of the pump at reference altitude
$P_2$: pressure value on second driving condition of the pump at reference altitude
$P_3$: pressure value on first driving condition of the pump at another altitude different from reference altitude
$P_4$: pressure value on second driving condition of the pump at another altitude different from reference altitude.

10. The cooling device according to claim 9, wherein:
the storage unit stores, beforehand, a second parameter to associate the altitude with a difference of the number of revolutions of the cooling fan at one altitude from that of the cooling fan at another altitude, a third parameter to associate the altitude with a difference of pressure generated by the pump at one altitude from that generated by the pump at another altitude, a fourth parameter to associate the number of revolutions of the cooling fan with an environmental temperature, and a fifth parameter to associate the pressure generated by the pump with the environmental temperature; and
the control unit acquires the difference in number of revolutions based on the altitude calculated from the first parameter and the change rate d acquired by the measurement, and the second parameter, and drives the cooling fan by setting, as the target number of revolutions, the number of revolutions acquired by adding the number of revolutions of the cooling fan acquired by using the fourth parameter to the difference in number of revolutions, and acquires the pressure difference based on the altitude calculated from the first parameter and the change rate d acquired by the measurement, and the third parameter, and drives the pump by setting, as target pressure, pressure acquired by adding pressure acquired by using the fifth parameter and generated by the pump to said pressure difference.

11. A projection-type display device comprising:
the cooling device according to claim 9; and
a light source configured to emit light for projecting an image,
wherein the injection unit injects air to the light source.

12. The cooling device according to claim 8, wherein:
the storage unit stores, beforehand, a second parameter to associate the altitude with a difference of the number of revolutions of the cooling fan at one altitude from that of the cooling fan at another altitude, a third parameter to associate the altitude with a difference of pressure generated by the pump at one altitude from that generated by the pump at another altitude, a fourth parameter to associate the number of revolutions of the cooling fan with an environmental temperature, and a fifth parameter to associate the pressure generated by the pump with the environmental temperature; and
the control unit acquires the difference in number of revolutions based on the altitude calculated from the first parameter and the change rate d acquired by the measurement, and the second parameter, and drives the cooling fan by setting, as the target number of revolutions, the number of revolutions acquired by adding the number of revolutions of the cooling fan acquired by using the fourth parameter to the difference in number of revolutions, and acquires the pressure difference based on the altitude calculated from the first parameter and the change rate d acquired by the measurement, and the third parameter, and drives the pump by setting, as target pressure, pressure acquired by adding pressure acquired by using the fifth parameter and generated by the pump to said pressure difference.

13. A projection-type display device comprising:
the cooling device according to claim 12; and
a light source configured to emit light for projecting an image,
wherein the injection unit injects air to the light source.

14. A projection-type display device comprising:
the cooling device according to claim 8; and
a light source configured to emit light for projecting an image,
wherein the injection unit injects air to the light source.

* * * * *